US008552888B2

(12) United States Patent
Perrie et al.

(10) Patent No.: US 8,552,888 B2
(45) Date of Patent: Oct. 8, 2013

(54) METHOD AND DEVICE FOR AUTOMATICALLY ESTIMATING AN AIR SPEED OF AN AIRCRAFT

(75) Inventors: Jean-Damien Perrie, Toulouse (FR); Valérie Brivet, Leguevin (FR); Stéphane Saint-Aroman, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 259 days.

(21) Appl. No.: 13/076,701

(22) Filed: Mar. 31, 2011

(65) Prior Publication Data

US 2011/0264308 A1    Oct. 27, 2011

(30) Foreign Application Priority Data

Apr. 21, 2010   (FR) ...................................... 10 01696

(51) Int. Cl.
*G01C 15/10*  (2006.01)
(52) U.S. Cl.
USPC ...... 340/978; 701/7; 701/3; 702/96; 702/144; 700/304; 340/969; 340/970; 340/973; 340/963; 340/977
(58) Field of Classification Search
None
See application file for complete search history.

(56) References Cited

U.S. PATENT DOCUMENTS

| | | | | |
|---|---|---|---|---|
| 4,764,872 A | * | 8/1988 | Miller | 701/3 |
| 4,829,441 A | * | 5/1989 | Mandle et al. | 702/96 |
| 5,797,105 A | * | 8/1998 | Nakaya et al. | 701/7 |
| 5,901,272 A | * | 5/1999 | Schaefer et al. | 706/17 |
| 6,101,429 A | * | 8/2000 | Sarma et al. | 701/7 |
| 6,205,376 B1 | * | 3/2001 | Gordon | 701/4 |
| 6,452,542 B1 | * | 9/2002 | Bachinski et al. | 342/357.75 |
| 6,473,676 B2 | * | 10/2002 | Katz et al. | 701/4 |
| 6,531,967 B2 | * | 3/2003 | Djorup | 340/949 |
| 6,587,757 B2 | * | 7/2003 | Sainthuile | 701/1 |
| 6,594,559 B2 | * | 7/2003 | Alwin et al. | 701/14 |
| 8,055,396 B2 | * | 11/2011 | Yates et al. | 701/16 |
| 8,229,606 B2 | * | 7/2012 | Vos et al. | 701/4 |
| 2004/0193333 A1 | * | 9/2004 | Tschepen et al. | 701/7 |
| 2005/0096801 A1 | * | 5/2005 | Luo | 701/3 |
| 2006/0178790 A1 | * | 8/2006 | Shigemi et al. | 701/7 |
| 2006/0212182 A1 | * | 9/2006 | Shaw | 701/12 |

(Continued)

FOREIGN PATENT DOCUMENTS

FR      2911682      7/2008

OTHER PUBLICATIONS

French Patent Office, International Search Report FR 1001696 (2 pgs.), Dec. 3, 2010.

*Primary Examiner* — Thomas Tarcza
*Assistant Examiner* — Richard Goldman
(74) *Attorney, Agent, or Firm* — Wood, Herron & Evans, LLP

(57) ABSTRACT

A device calculates a first air speed representing an estimated air speed during flight using measurements of static pressure and total pressure onboard the aircraft. The device includes a storage device for storing in memory, in case of detection of a ground taxiing of the aircraft, the most recently determined value of static pressure corrected from induced aerodynamic effects. As a result, a second air speed representing the estimated air speed during the ground taxiing may be calculated by implementing a correction and using the most recently determined value of static pressure when the ground taxiing of the aircraft is detected. A method for automatically estimating an air speed of an aircraft is also provided.

11 Claims, 1 Drawing Sheet

(56) References Cited

U.S. PATENT DOCUMENTS

| | | | |
|---|---|---|---|
| 2007/0213889 A1* | 9/2007 | Parra Carque | 701/7 |
| 2009/0093919 A1* | 4/2009 | Certain | 701/7 |
| 2009/0222150 A1* | 9/2009 | Preaux | 701/7 |
| 2010/0042267 A1* | 2/2010 | Goodman et al. | 701/3 |
| 2010/0070112 A1* | 3/2010 | Couey et al. | 701/3 |
| 2011/0184592 A1* | 7/2011 | Elias et al. | 701/7 |

* cited by examiner

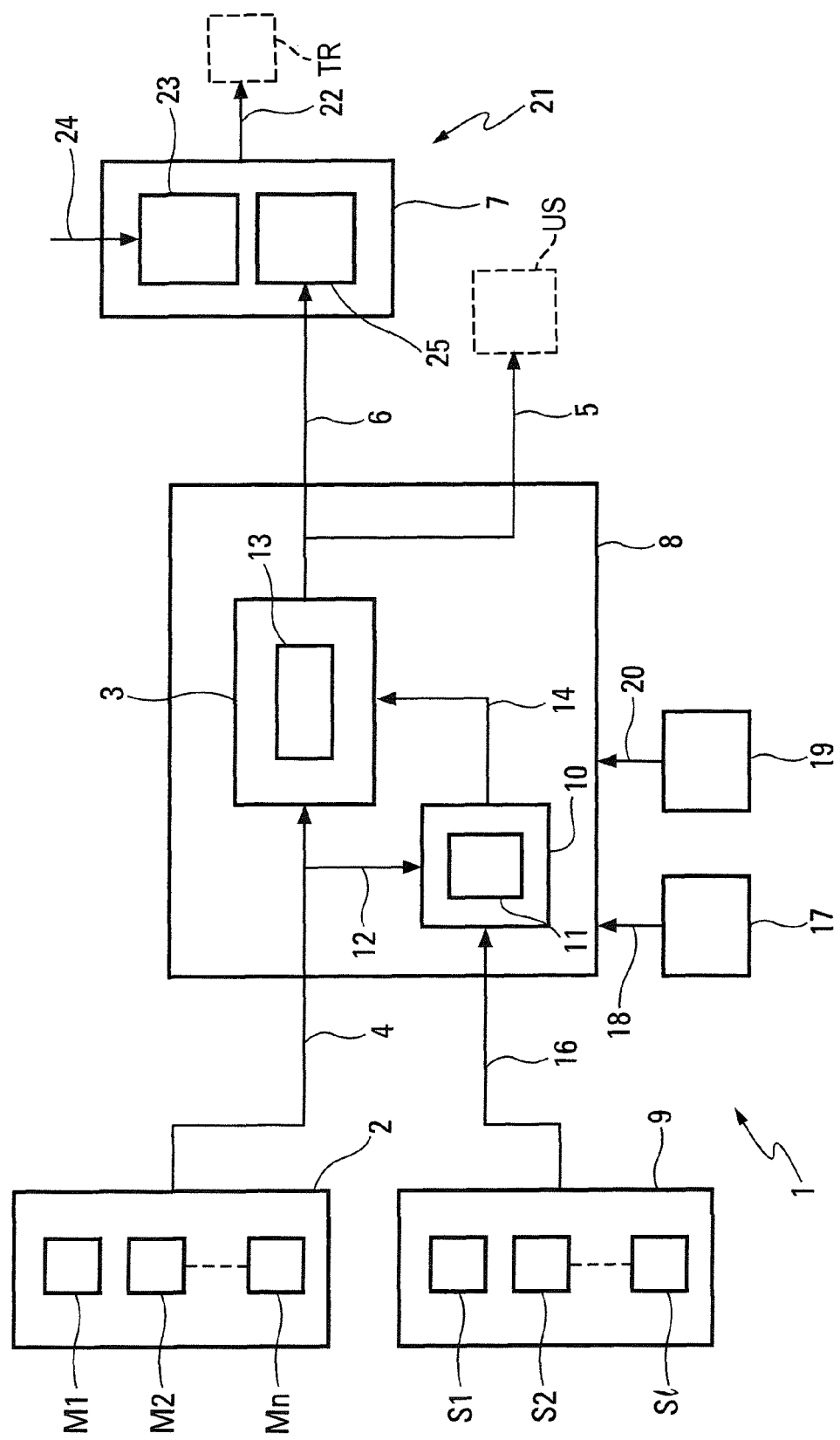

METHOD AND DEVICE FOR AUTOMATICALLY ESTIMATING AN AIR SPEED OF AN AIRCRAFT

TECHNICAL FIELD

The present invention relates to a process and a device for automatically estimating an air speed of an airplane, in particular of a transport airplane. It also relates to a method and a system for automatically managing the activation of thrust reversers of an airplane, comprising respectively such a process and such a device.

BACKGROUND

It is known that, on-board an airplane, it is important to know some information about the flight of the airplane. Anemometric measurement techniques enable to know such information, and more specifically, the speed of the airplane, its position in the space with respect to the air, its altitude as well as direct air parameters. Such parameters, referred to as anemoclinometric parameters, essentially include:
the total pressure;
the static pressure;
the leading angle representing the angle between the chord of a wing of the airplane and the direction of the air flow wherein the airplane is moving;
the sideslip angle representing the angle of the air flow with respect to the trajectory of the airplane; and
the total air temperature ("TAT").

In order to have access to such anemoclinometric parameters, current airplanes use measurement instruments that are responsive to properties relating to the dynamics of the surrounding air, i.e. generally:
total pressure probes (Pitot tubes);
static pressure probes for measuring the atmospheric pressure;
paddles or weathercocks for determining the leading and the sideslip angles; and
total temperature probes for measuring the TAT or ambient temperature.

Such measurement instruments, including such probes, are directly connected to circuitry or to computers in the airplane. More particularly, the navigation systems of the airplane generally comprise one or more primary circuitry of the Air Data Reference Inertial Unit ("ADIRU") type, and one or optionally more standby circuitry. Said primary circuitry each comprise devices for processing rough data, supplied by said probes, for deducing therefrom the anemoclinometric parameters required for optimal operation of the airplane. Moreover, said standby circuit is used should primary circuitry fail (with the aim at overcoming such a failure) or for clearing up a doubt about the accuracy of primary parameters.

Furthermore, it is known that the engines of an airplane are generally provided with thrust reversers. A thrust reverser is a device allowing to direct forward the thrust exerted by a propeller engine or a jet engine with a view to slowing down the airplane and to reducing the braking distances upon a landing. On a jet engine, mobile members are moved so as to more or less completely obstruct the nozzle, thus deflecting forward the flow of hot gases from the turbine.

Thrust reverser deployment impacts on the aerodynamic flow around the static pressure probes and can result in a decrease of the static pressure being measured. Such a decrease of the static pressure leads to an increase of the displayed air speed, being calculated from such a measured static pressure.

Now, to avoid hot gases from being re-injected into the engines, thrust reversers are automatically deactivated beneath a given displayed air speed. Consequently, if the air speed is not optimally indicated, thrust reversers are not deactivated at the right time and the airplane can be submitted to hot gases being reinjected.

More precisely, upon the activation of the thrust reversers, an overpressure (or a depression) could occur being generated by hot air flowing on the static pressure probes, and involving a decrease (or an increase) of the Calibrated Air Speed ("CAS") type corrected air speed. Thus:
in the case of a depression, the CAS corrected air speed is overestimated and the thrust reversers are deactivated too late, having thus as a direct effect hot gases being re-injected; and
in the case of an overpressure, the CAS corrected air speed is underestimated and the thrust reversers are deactivated earlier than necessary.

In both cases, braking or stopping thrust reversers is not optimized.

The present invention aims at solving the above mentioned drawbacks. It relates to a process for estimating an air speed of an airplane, being particularly accurate and not being disturbed, more specifically, by effects generated by the ground activation of the thrust reversers in the airplane.

SUMMARY OF THE INVENTION

To this end, according to this invention, the process wherein, automatically and repeatedly, the following operations are performed:
the static pressure and the total pressure are determined by measurements performed by probes being on-board the airplane; and
by said static pressure and said total pressure, a first air speed is calculated, representing the estimated air speed during flight, In addition, automatically, the following operations are performed:
parameters of the airplane are monitored so as to be able to detect a ground taxiing of said airplane; and
should a ground taxiing of the airplane be detected, the last value of determined static pressure is stored, and a correction of the estimated air speed is implemented, repeatedly performing the following operations:
the total pressure is determined by measurements performed by probes being on-board the airplane; and
by means of the thus determined total pressure and said stored static pressure, a second air speed is calculated representing the estimated air speed during the ground taxiing.

Thus, when the airplane is taxiing on the ground, or after a landing or a rejected takeoff, the static pressure is automatically frozen, being used for estimating the air speed so that the estimated air speed being obtained is not affected by the disturbances undergone by the static pressure probes on the ground, including further to the thrust reversers being activated.

Thus, on-board the airplane, an estimated air speed is available, in particular a CAS type corrected air speed or an Indicated Air Speed ("IAS") type indicated air speed, being particularly accurate. Such an estimated air speed can be used by various systems of the airplane. In particular, it can be used for activating thrust reversers, as indicated therein below. In such a case, the above mentioned problems of reinjection of hot gases are avoided. Furthermore, braking is optimized, and no accelerated ageing occurs in the braking system of the airplane.

Moreover, advantageously, a ground taxiing of the airplane is detected when at least one of the following conditions is met:
the landing gear of the airplane is in a compressed state;
the ground speed of the airplane is lower than a predetermined speed value;
the airplane is in a ground phase; and
the static pressure is substantially equal to that corresponding to the altitude of an airport used by the airplane.

Preferably, more particularly for detection reliability reasons, a ground taxiing of the airplane is detected when several of the previous conditions are simultaneously met.

Furthermore, advantageously, in order not to trigger the correction according to this invention in a flight phase or in another phase for which it is useless, said correction is not implemented when at least one of the following conditions is met:
the landing gear is not in a compressed state;
the ground speed of the airplane is larger than a predetermined speed value;
the airplane is in a flight phase; and
the correction has already been implemented for a period of time being larger than a predetermined period of time.

Furthermore, advantageously, in a particular embodiment, it could be contemplated to deactivate the implementation of previously activated correction, when at least one particular deactivation condition is met, for example, the ground speed of the airplane is larger than a predetermined speed value.

The air speed, being estimated according to this invention, could thus be used by various systems of the airplane so that several applications are possible.

In a preferred application, said estimated air speed of the airplane is used in a method for automatically managing the activation of thrust reversers in an airplane, wherein, when the thrust reversers are activated:
automatically and repeatedly, said estimated air speed is compared to a predetermined speed value; and
as soon as said estimated air speed becomes lower than said predetermined speed value, said thrust reversers are automatically deactivated.

Thus, the estimated air speed to be used for deactivating thrust reversers is optimized so that the automatic deactivation is implemented at the appropriate time, i.e. neither too early nor too late. Thus, the above mentioned problems are overcome of hot gases being re-injected, which could occur in usual activations. Furthermore, braking is also optimized, and no accelerated aging occurs in the braking system of the airplane.

Preferably, the thrust reversers are usually activated when usual activation conditions are met. However, in a particular embodiment, said thrust reversers are activated when the conditions relating to a ground taxiing, i.e. the above mentioned conditions intended for triggering the correction according to this invention, are met.

The present invention further relates to a device for automatically estimating an air speed of an airplane, in particular a transport airplane.

To this end, according to this invention, the device includes:
a set of pressure probes for repeatedly measuring and determining the static pressure and the total pressure by measurements performed on-board the airplane; and
a calculation device for repeatedly calculating, using said static pressure and said total pressure, a first air speed representing the estimated air speed during flight.

The device further comprises:
a monitoring device for monitoring parameters of the airplane to thereby detect a ground taxiing of said airplane;
a storage device for storing in a memory, should a ground taxiing of the airplane be detected, the most recently determined value of static pressure from the set of pressure probes; and
a correction device for repeatedly calculating, should the ground taxiing of the airplane be detected, using the total pressure determined by a set of pressure probes and using the static pressure stored in the memory, a second air speed representing the estimated air speed during the ground taxiing.

The present invention further relates to:
a system for managing the activation of thrust reversers of an airplane, comprising a device such as specified herein above; and/or
an aircraft, in particular a transport airplane, comprising such a system or such a device.

BRIEF DESCRIPTION OF THE DRAWING

The single FIGURE of the appended drawing will better explain how this invention can be implemented. Such a single FIGURE is the block diagram of a device according to this invention.

DETAILED DESCRIPTION

The device 1 according to this invention and schematically represented on the FIGURE is aimed at automatically estimating an air speed of an airplane (not shown), in particular a transport airplane, so as to provide an air speed being particularly accurate and not being disturbed, more specifically, by effects generated by the ground activation of thrust reversers in the airplane.

The device 1 being on board is of the type comprising:
a set 2 of usual pressure probes Ml, M2, . . . , Mn, n being an integer, being on-board the airplane, for repeatedly measuring data allowing to determine more specifically the static pressure and the total pressure existing in the external environment of the airplane. The set 2 more specifically comprises total pressure probes and static pressure probes; and
a calculation device 3 being connected via a link 4 to the set 2 and being formed so as to repeatedly calculate, using the static pressure and total pressure, a first air speed representing the estimated air speed during flight. Such an estimated air speed could be supplied by a link 5 to user systems US of the airplane and/or by a link 6 to a thrust actuator 7, to be specified herein below, for activating and deactivating thrust reversers of the airplane.

The static pressure and the total pressure could be calculated, using the data being measured, at the level of the set 2 or at the level of a unit 8 comprising the calculation device 3. Such a unit 8 could be an inertial reference and air data unit, including of the ADIRU type. Moreover, the set 2 could also comprise paddles or weathercocks for determining the leading and sideslip angles of the airplane, as well as total temperature probes.

The device 1 can perform, using more specifically calculation means 3, in particular the following operations:
A/ calculating the barometric altitude H as a function of the corrected static pressure P of the Mach effect and the leading edge. Calculating the barometric altitude H from the static pressure occurs by the following expressions:

if (P>226.31881 mb), $$H = 145447.2037 * (1 - (P/1013.25)^{0.1902545722})$$ [Eq. 1]

otherwise:

$$H = 36089.23885 + (20805.85865 * ln(226.31881/P))$$ [Eq. 2]

wherein H is the standard altitude; and

P is the corrected mean static pressure of the Mach effect and the leading edge (conventional aerodynamic correction), B/ calculating the corrected mean static pressure of the Mach effect and the leading edge ($P_S = P$), by means of the following expression:

$$P_s = \psi * (1 + G1 + G2)$$ [Eq. 3]

wherein G1 is a correction factor linked to the Mach,

G2 a correction factor linked to the leading edge, and $\psi$ the measurement of the static pressure indicated by the static pressure probe, C/ calculating a dynamic impact pressure $Q_c$ being defined by:

$$Q_c = P_t - P_s$$ [Eq. 4]

wherein $P_t$ is the total pressure measured by the Pitot tube,

D/ calculating the CAS corrected air speed by the following expression:

$$CAS = K * ((Q_c/P_0 + 1)^{(2/7)} - 1)^{(1/2)}$$ [Eq. 5]

wherein K is a constant and $P_0 = 1013.25$ mbar,

E/ moreover, integrating different effects into the static pressure. A corrected static pressure of the ground effect could be calculated:

$$P_s = \psi * (1 + G1 + G2 + G_{ground} + G_{Gear})$$ [Eq. 6]

wherein $G_{Ground}$ is a correction factor linked to the ground effect and $G_{Gear}$ a correction factor linked to the effect of the landing gear, F/ calculating the impact pressure being defined by:

$$Q_{c\_} = P_t - P_{s\_}$$ [Eq. 7]

wherein $P_t$ is the total pressure measured by the Pitot tube, and

G/ calculating the IAS indicated air speed by the following expression:

$$IAS = K * ((Q_{c\_}/P_0) + 1)^{(2/7)} - 1)^{(1/2)}$$ [Eq. 8]

wherein K is a constant and $P_0 = 1013.25$ mbar.

According to this invention, for determining an estimated air speed being particularly accurate and not being disturbed, including, by effects generated by the ground activation of thrust reversers in the airplane, the device 1 further comprises, as shown on FIGURE:

a monitoring device 9, to be specified herein below, for monitoring parameters of the airplane so as to be able to detect a ground taxiing of the airplane;

a storage device 10 for storing, on a memory 11, should a ground taxiing of the airplane be detected, the last value of static pressure determined by the set of pressure probes 2 or the ADIRU unit 8 and received by a link 12; and a correction device 13, being, for example, integrated into the calculation device 3, for repeatedly calculating, should a ground taxiing of the airplane be detected, by, on the one hand, the total pressure being the last determined by the set 2 or the unit 8 (and received by the link 12) and, on the other hand, of the static pressure registered by the storage device 10 (and received by a link 14), a second air speed that will be then transmitted as an estimated and corrected air speed during the ground taxiing (via the links 5 and/or 6).

Such an air speed is calculated by the above mentioned calculations, but using, not the usual static pressure, but the static pressure registered by the storage device 10.

Thus, when the airplane is taxiing on the ground, after a Rejected Take Off ("RTO") type landing or takeoff, the device 1 according to this invention automatically freezes the static pressure to be used for estimating the air speed so that the then obtained estimated air speed is not affected by the disturbances undergone by the ground static pressure probes, including further to the activation of thrust reversers.

An estimated air speed is thus available on-board the airplane, in particular a CAS type corrected air speed or an IAS type indicated air speed being particularly accurate, whatever the phase of the airplane and including upon a ground taxiing of said airplane.

In a particular embodiment, the monitoring device 9, which is connected via a link 16 to the unit 8, comprise monitoring members S1, S2, . . . , S1, 1 being an integer, for monitoring parameters of the airplane, being representative of a ground taxiing of the airplane. Such monitoring members S1, S2, . . . , S1 could monitor, more specifically, parameters (compression state of the landing gear of the airplane(indication contact with a ground surface), ground speed of the airplane, phase of the airplane, static pressure, etc.) that allow to detect at least some of the following conditions:

the landing gear of the airplane is in a compressed state;

the ground speed of the airplane is lower than a predetermined speed value;

the airplane is on the ground surface; and the static pressure is substantially equal to that corresponding to the altitude of an airport used by the airplane.

In a particular embodiment, the monitoring device 9, which is connected via a link 16 to the unit 8, comprise monitoring members S1, S2, . . . , S1, 1 being an integer, for monitoring parameters of the airplane, being representative of a ground taxiing of the airplane. Such monitoring members S1, S2, . . . , S1 could monitor, more specifically, parameters (compression state of the landing gear of the airplane, ground speed of the airplane, phase of the airplane, static pressure, etc.) that allow to detect at least some of the following conditions:

the landing gear of the airplane is in a compressed state;

the ground speed of the airplane is lower than a predetermined speed value;

the airplane is in a ground phase; and the static pressure is substantially equal to that corresponding to the altitude of an airport used by the airplane.

More specifically, for detection reliability reasons, the monitoring device 9, preferably, detects a ground taxiing of the airplane only when several of the previous conditions are simultaneously met.

Furthermore, in a particular embodiment, the device 1 comprises an inhibiting device 17 for inhibiting the activation of the correction, so as not to trigger the correction according to this invention in a flight phase or in another phase for which it is useless. Using the inhibiting device 17 being connected by means of a link 18 to the unit 8, the device 1 does not implement the correction when one or more of the following conditions are met:
- the landing gear is not in a compressed state;
- the ground speed of the airplane is larger than a predetermined speed value;
- the airplane is in flight; and
- the correction has already been implemented and is ongoing for a period of time being larger than a predetermined period of time, for example, one minute.

Moreover, in a particular embodiment, the device 1 further comprises a deactivation device 19 being connected via a link 20 to the unit 8 and being formed so as to deactivate the implementation of a previously activated correction, when at least one particular deactivation condition is met, for example, when the ground speed of the airplane is larger than a predetermined speed value.

The air speed, being estimated according to this invention, could be used by various systems of the airplane so that several applications are possible.

In a preferred application, the device 1 is part of a system 21 for automatically managing the activation of usual thrust reversers TR of the airplane. Such a system 21 comprises, in addition to the device 1, the thrust actuator 7 for activating and deactivating thrust reversers TR, controlling the thrust reversers TR via a link 22. The thrust actuator 7 comprises a thrust activation device 23 for usually activating the thrust reversers TR when usual activation conditions (received by a link 24) are met.

Said means 7 further comprise means 25:
- for comparing, automatically and repeatedly, said estimated air speed received from the device 1 via the link 6 to a predetermined speed value; and
- for automatically deactivating said thrust reversers(via the link 22) as soon as said estimated air speed becomes lower than said predetermined speed value.

Thus, the estimated air speed to be used for deactivating thrust reversers is optimized so that the automatic deactivation is implemented at the appropriate time, i.e. neither too early nor too late. As a result, the above problems of hot gases being re-injected that could occur with the usual activations are avoided. Furthermore, braking is also optimized, and no accelerated ageing occurs in the braking system of the airplane.

In a particular embodiment, the thrust activation device 23 are linked by the link 24 to the monitoring device 9 and they activate the thrust reversers when the conditions relating to a ground taxiing, i.e. the above mentioned conditions intended for triggering the correction according to this invention, are met. Thus, in this particular embodiment, the monitoring device 9 allow to both trigger the correction implemented by the device 1 and the activation of thrust reversers.

The invention claimed is:

1. A process for automatically estimating an estimated air speed of an airplane, the process wherein, automatically and repeatedly, the following operations are performed:
   - measuring a plurality of ambient pressure measurements using a set of pressure probes on board the airplane;
   - determining the static pressure and the total pressure using the pressure measurements performed by the set of pressure probes;
   - calculating a first air speed with a calculation device using the static pressure and the total pressure, the first air speed, representing the estimated air speed during flight,
   - monitoring parameters of the airplane with a monitoring device to thereby detect a ground taxiing of the airplane; and
   - should a ground taxiing of the airplane be detected, storing a most recently determined value of static pressure in a memory with a storage device, and implementing a correction to the estimated air speed with a correction device integrated into the calculation device, by repeatedly performing the following operations:
     - determining the total pressure using the pressure measurements performed by the set of pressure probes during the ground taxiing; and
     - calculating a second air speed with the correction device based on the determined total pressure during the ground taxiing and the stored static pressure from the memory and without using a static pressure determined during the ground taxiing, the second air speed representing the estimated air speed during the ground taxiing.

2. The process according to claim 1, wherein the ground taxiing of the airplane is detected by the monitoring device when at least one of the following conditions is met:
   - a landing gear of the airplane is in a compressed state indicating contact with a ground surface;
   - a ground speed of the airplane is lower than a predetermined speed value;
   - the airplane is on the ground surface; and
   - the static pressure is equal to that corresponding to the altitude of an airport used by the airplane.

3. The process according to claim 1, wherein the estimated air speed is a corrected air speed.

4. The process according to claim 1, wherein the estimated air speed is an indicated air speed.

5. The process according to claim 1, wherein the implementing of the correction to the estimated air speed is not performed when at least one of the following conditions is met as detected by the monitoring device:
   - a landing gear is not in a compressed state that would indicate contact with a ground surface;
   - a ground speed of the airplane is larger than a predetermined speed value;
   - the airplane is in flight; and
   - the implementation of the correction to the estimated air speed has been ongoing for a period of time being larger than a predetermined period of time.

6. The process according to claim 1, further comprising: deactivating the implementation of the correction with at least one of an inhibiting device and a deactivation device when at least one deactivation condition is detected.

7. A method for automatically managing the activation of thrust reversers in an airplane, the method wherein, when the thrust reversers are activated:
   - automatically and repeatedly, an air speed of the airplane is estimated, and compared to a predetermined speed value; and
   - as soon as said estimated air speed becomes lower than said predetermined speed value, the thrust reversers are automatically deactivated,
   - wherein the-air speed of the airplane is estimated, implementing the process of claim 1.

8. The method according to claim 7, wherein the thrust reversers are activated when the conditions relating to a ground taxiing are met.

9. A device for automatically estimating an estimated air speed of an airplane, the device comprising:
   - a set of pressure probes for repeatedly measuring a plurality of ambient pressure measurements and for determining the static pressure and the total pressure using the plurality of pressure measurements, which are performed on-board the airplane;

a calculation device for repeatedly calculating, by the static pressure and the total pressure, a first air speed representing the estimated air speed during flight, a monitoring device including a plurality of monitoring members for monitoring parameters of the airplane to thereby detect a ground taxiing of the airplane;

a storage device and a memory for storing, should the ground taxiing of the airplane be detected, a most recently determined value of static pressure determined using the plurality of pressure measurements from the set of pressure probes; and a correction device incorporated into the calculation device, the correction device repeatedly calculating a second air speed, should the ground taxiing of the airplane be detected, based on the total pressure during the ground taxiing based on the plurality of pressure measurements by the set of pressure probes and based on the stored static pressure from the memory, and without using a static pressure determined during the ground taxiing, wherein the second air speed represents the estimated air speed during the ground taxiing.

10. A system for automatically managing the activation of thrust reversers in an airplane, the system comprising;

a calculation device for, automatically and repeatedly, estimating an air speed of the airplane, and comparing it to a predetermined speed value; and a thrust deactivation device for automatically deactivating the preliminarily activated thrust reversers, as soon as the estimated air speed becomes lower than the predetermined speed value, wherein the calculation device comprises the device of claim 9, for automatically estimating the air speed of the airplane.

11. The device according to claim 9, wherein the monitoring device further comprises sensors that detect when at least one of the following conditions is met:

a landing gear of the airplane is in a compressed state indicating contact with a ground surface;

a ground speed of the airplane is lower than a predetermined speed value;

the airplane is on the ground surface; and the static pressure is equal to that corresponding to the altitude of an airport used by the airplane.

\* \* \* \* \*